United States Patent [19]

Dixon et al.

[11] Patent Number: 5,166,943

[45] Date of Patent: Nov. 24, 1992

[54] SINGLE DOMAIN STABILIZATION IN FERROELECTRIC CRYSTALS

[75] Inventors: George J. Dixon, Melbourne, Fla.; Richard H. Jarman, Naperville, Ill.

[73] Assignee: Amoco Corporation, Chicago, Ill.

[21] Appl. No.: 715,907

[22] Filed: Jun. 14, 1991

[51] Int. Cl.$^5$ .............................. H01S 3/10
[52] U.S. Cl. ........................... 372/21; 359/251; 310/359
[58] Field of Search .............. 372/21, 72; 359/251; 310/359; 340/173.2

[56] References Cited

U.S. PATENT DOCUMENTS

| | | | |
|---|---|---|---|
| 4,109,359 | 8/1978 | Cross et al. | 310/359 |
| 4,872,177 | 10/1989 | Baer et al. | 372/21 |
| 4,897,850 | 1/1990 | Crosby | 372/72 |

Primary Examiner—Leon Scott, Jr.
Attorney, Agent, or Firm—Stephen G. Mican; William H. Magidson; Frank J. Sroka

[57] ABSTRACT

A method and apparatus for preventing domains in ferroelectric crystals from depoling by providing compressive stress along a preferred crystallographic axis.

22 Claims, 2 Drawing Sheets

SINGLE DOMAIN STABILIZATION IN FERROELECTRIC CRYSTALS

BACKGROUND OF THE INVENTION

This invention relates to the application of ferroelectric crystals as nonlinear optical media, and more particularly to a method and apparatus for preventing depoling of domains in such crystals from a selected crystallographic axis.

Miniature solid state lasers that produce significant output in the blue and green regions of the visible light spectrum are highly desirable. However, there are technical problems associated with the generation of fundamental frequencies that correspond to such wavelengths using solid state lasers. Consequently, solid state lasers that produce outputs at such wavelengths generally include a means for generating a harmonic of their fundamental frequencies with sufficient efficiency to provide significant output in the blue or green regions of the visible spectrum.

The means for generating a harmonic of the fundamental frequency in solid state lasers is typically a nonlinear optical medium, such as a ferroelectric crystal that has suitable characteristics to provide high conversion efficiency in second harmonic generation (SHG), electro-optic (E-O) modulator and other nonlinear optical (NLO) applications. Potassium niobate ($KNbO_3$) is one ferroelectric crystal that is ideal for this application because it has a high degree of birefringence in the visible and near infrared regions of the visible spectrum and one of the highest values of nonlinear coefficients for any inorganic crystal. The high birefringence allows the crystal to achieve phase matched conditions in the blue region of the visible spectrum. The high value of nonlinear coefficient provides a correspondingly high degree of conversion efficiency for SHG, E-O modulator and other NLO applications.

Using $KNbO_3$ as the nonlinear medium in SHG applications, optical conversion efficiencies exceeding 40 percent have been achieved with external resonantly doubled diode lasers, and output powers of greater than 6 mW have been obtained from a diode pumped, internally doubled 946 nm Nd:YAG laser pumped by a 500 mW diode laser. Although the conversion efficiencies of these devices are adequate, certain opto-mechanical properties of $KNbO_3$ have made its use impractical for most NLO applications.

It is advantageous for any ferroelectric crystal used as a nonlinear optical medium to have its ferroelectric domains poled in a single direction. As-grown crystals almost always have a number of ferroelectric domains. They are poled to a single domain, typically by applying an electric field along the polar axis, or c-axis, of the crystal. Because $KNbO_3$ has an orthorhombic structure within the range of ordinary ambient temperatures, it has a number of different types of domain, some of which produce noticeable optical distortion at their boundaries. During the poling process, the crystal often becomes noticeably cloudy as its domains are rotated through different orientations to the desired direction.

Furthermore, $KNbO_3$ crystals are susceptible to depoling after the poling process. Depoling can occur as a result of thermal stress, mechanical shock, or the combination thereof. Depoling typically occurs when the crystal is heated above 70 degrees Celsius. To utilize a $KNbO_3$ crystal for SHG under noncritical phase matching (NCPM) conditions, with a second harmonic frequency corresponding to 946 nm, it is necessary to operate the crystal at a temperature of approximately 180 degrees Celsius. This almost always causes the crystal to depole as it is cooled back to the ordinary ambient temperature range. It is therefore necessary to minimize the degree of depoling in ferroelectric crystals such as $KNbO_3$ to successfully use them in practical NLO applications.

One approach that has been attempted in the effort to minimize depoling of ferroelectric crystals during temperature recycling under these conditions has involved the application of a static electric field along the c-axis of the crystal. However, this procedure has not been successfully implemented, and in any case it does nothing to minimize depoling due to mechanical stresses or shock.

One approach that has been used to minimize depoling due to mechanical stress of the crystal mounting has involved padding the crystal with zinc foil. Another approach has involved the attachment of the crystal to a thermoelectric cooler with a flexible, thermally conducting medium. Neither of these approaches is suitable for practical applications in which the mechanical position of the crystal must be rigidly fixed over the life of the laser in which it is used and subjected to a large number of temperature cycles.

Therefore, the practical commercial application of solid state lasers that use $KNbO_3$ crystals for the nonlinear medium has not been feasible. Instead, efforts have been made to use other less efficient, but more stable, ferroelectric crystals, and to develop other techniques for NLO applications.

SUMMARY OF THE INVENTION

The present invention overcomes the problems associated with the use of ferroelectric crystals such as $KNbO_3$ as nonlinear optical media in solid state laser systems by providing compression along the axis of highest atomic density, orthogonal to the axis of lowest atomic density. The pressure differential between the axes of highest and lowest density acts to preserve the crystallographic orientation of the nonlinear medium.

In the preferred embodiment, for a laser system having a fundamental wavelength laser source and a nonlinear crystalline medium for accepting radiation from the fundamental wavelength laser source, the nonlinear medium having at least a first crystallographic axis of highest density, a second crystallographic axis of lowest density and a substantially singular initial domain, the methodology for minimizing the formation of domains in the nonlinear medium that substantially deviate from the initial domain comprises the steps of: positioning the nonlinear medium to accept radiation from said fundamental wavelength laser source; and compressing said positioned medium along said first axis to create a pressure differential between said first and second axes that is sufficient to minimize the formation of domains that deviate from said initial domain.

In the preferred embodiment, in a laser system having a fundamental wavelength laser source and a nonlinear crystalline medium for accepting radiation from the fundamental wavelength laser source, the nonlinear medium having at least a first crystallographic axis of highest density, a second crystallographic axis of lowest density and a substantially singular initial domain, the apparatus for minimizing the formation of domains in the nonlinear medium that substantially deviate from the initial domain comprises: means for positioning the nonlinear medium to accept radiation from said fundamental wavelength laser source; and means for compressing said positioned medium along said first axis to create a pressure differential between said first and second axes that is sufficient to minimize the formation of domains that deviate from said initial domain.

DESCRIPTION OF THE PREFERRED EMBODIMENT

Figure 1:
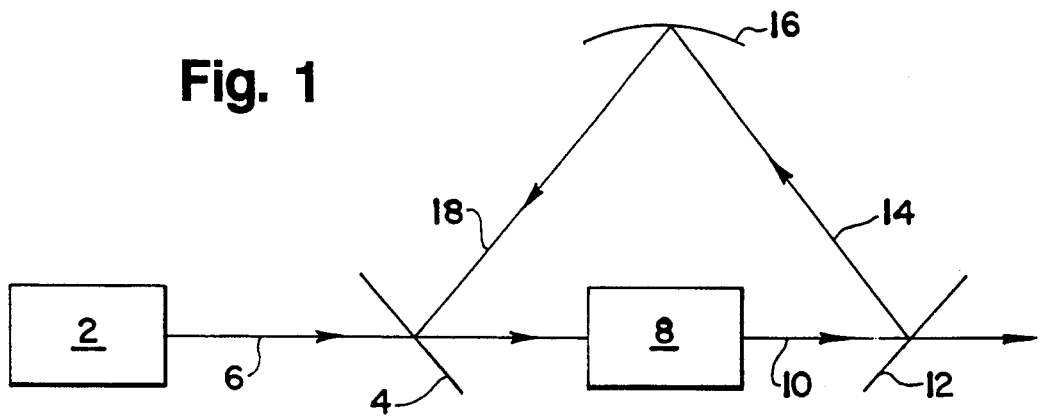
FIG. 1 is a block diagram of a typical self-locking, externally doubled diode (SLEDD) laser that is suitable for incorporating the preferred embodiment of the present invention.

Referring to the drawings, wherein reference characters designate like or corresponding parts throughout the views, FIG. 1 is a block diagram of a solid state SLEDD laser that is suitable for incorporating preferred embodiment of the present invention. The SLEDD laser comprises a fundamental wavelength laser source 2, in this case a diode laser, that generates a submultiple of the desired output frequency. If the desired output frequency corresponds to a wavelength of 432 nm, in the blue region of the visible spectrum, the output frequency of the fundamental wavelength laser source 2 is preferably half of the desired output frequency, with an infrared wavelength corresponding to approximately 864 nm.

The output of the fundamental wavelength laser source 2 passes through a first semi-transparent mirror 4 via an optical path 6. The output of the fundamental wavelength laser source 2 that passes through the first mirror 4 then passes through a nonlinear ferroelectric crystal medium 8. The nonlinear medium 8 preferably comprises a KNbO$_3$ crystal, although the nonlinear medium may alternately comprise analogous crystals suitable for the purpose, such as Ba$_{1-x}$Sr$_x$NbO$_3$ or Ba$_2$NaNbO$_{15}$. The output of the fundamental wavelength laser source 2 is preferably focused within the volume of the nonlinear medium 8 with a focusing lens (not shown) that may be incorporated within the fundamental wavelength laser source 2 or located along the optical path 6 between the fundamental wavelength laser source 2 and the nonlinear medium 8.

The nonlinear characteristic of the nonlinear medium 8 generates at least a second harmonic of the infrared radiation from the fundamental wavelength laser source has a wavelength of approximately 864 nm in this case, the second harmonic produced by the nonlinear medium 8 is approximately 432 nm. The 864 nm and 432 nm radiation exiting from the nonlinear medium 8 then propagates from the nonlinear medium 8 along an optical path 10 through a second semi-transparent mirror 12.

The second mirror 12 reflects at least a portion of the 864 nm radiation from the optical path 10 to an optical path 14. Preferably, the second mirror 12 is substantially highly reflective at the 864 nm wavelength and substantially highly transmissive at the 432 nm wavelength, so that substantially all of the 864 nm radiation is reflected along the optical path 14. A passive ring cavity resonator mirror or plate 16 intercepts the 864 nm radiation along the optical path 14 and reflects it along an optical path 18.

The first mirror 4 intercepts the 864 nm radiation along the optical path 18 and reflects it back toward the nonlinear medium 8 along the optical path 6. The first mirror 4 is partially transmissive, in the vicinity of 2 percent, for the 864 nm radiation passing along the optical path 18 and for the 864 nm radiation passing along the optical path 6.

The resonator plate 16 is positioned to provide the proper amplitude and phase for the 864 nm radiation reflected back along the optical path so as to provide an effective positive feedback path. As a result, an external mirror ring resonator path is established for the nonlinear medium 8 by the first mirror 4, the second mirror 12 and the resonator plate 16.

Because the second mirror 12 is substantially highly transmissive at 432 nm, substantially all of the second harmonic 432 radiation produced by the nonlinear medium 8 is transmitted through the second mirror 12. Thus, this configuration provides a great deal of frequency doubling conversion efficiency.

The nonlinear medium 8 preferably has faces along the optical path 6 that are antireflective for both the 864 nm and 432 nm radiation. It is also essential that the nonlinear medium 8 be rigidly mounted in accordance with the present invention as described below in order to secure stable SHG operation under all operating conditions.

The direct backreflection off of the entrance face of the nonlinear medium 8 is conveniently used to lock the fundamental wavelength laser source 2 to the resonance of the external ring cavity path without the need for a separate feedback path. The frequency of the fundamental wavelength laser source 2 and the tilt of the nonlinear medium 8 are both adjusted to provide spectral mode matching of the fundamental wavelength laser source 2 and the external ring cavity path.

In order for SHG to be obtained in a stable fashion from the SLEDD laser described above, it is essential that the nonlinear medium 8 be held in a fixed orientation with respect to the input radiation from the fundamental wavelength laser source 2 along the optical path 6. This is because of the acceptance angle dictated by the wavelengths used and the refractive indices of the nonlinear medium 8. In addition, the temperature dependence of the refractive indices may demand that the nonlinear medium 8 be held at a constant temperature, requiring a mount that allows for good thermal conductivity and an isothermal environment. Furthermore, the nonlinear medium 8 must be rigidly held to insure that the feedback off of the entrance face of the nonlinear medium 8 back to the fundamental wavelength source laser 2 will stably lock the frequency of the fundamental wavelength laser source 2 to the resonant frequency of the external ring cavity path.

In the case where the nonlinear medium 8 comprises a KNbO$_3$ crystal as described above, the crystal is subject to formation of domains when subject to stress. These domains destroy the optical quality of the crystal and render it useless in a laser. Any sort of rigid mounting generally exerts or transfers a certain amount of stress to the crystal. This stress may be due to thermal shifts, mechanical shock or the combination thereof.

Figure 2:
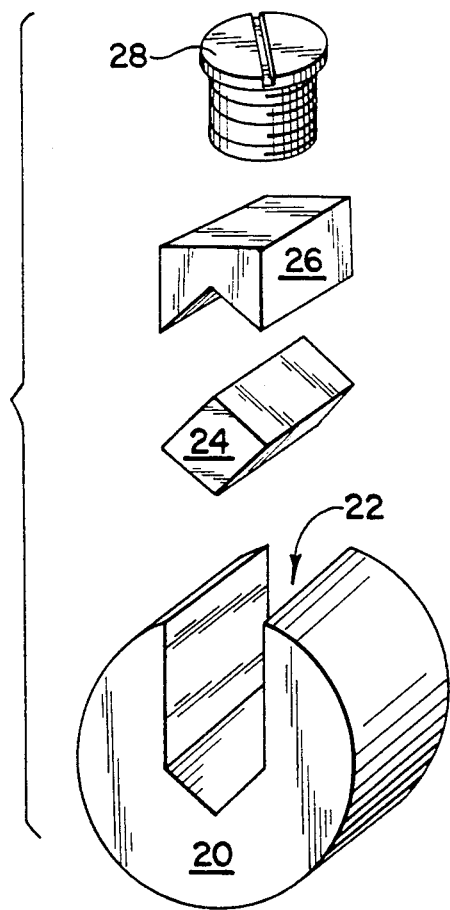
FIG. 2 is an exploded perspective view of a mounting for a nonlinear ferroelectric crystal medium according to the prior art.
Figure 3:
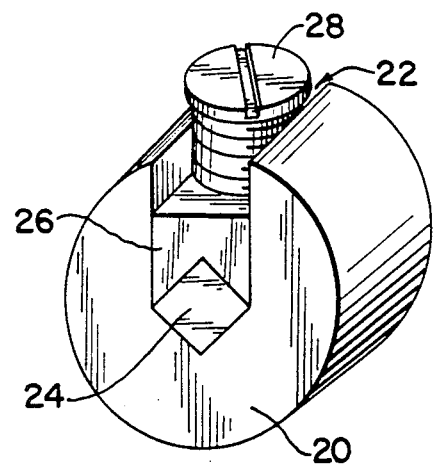
FIG. 3 is an exploded perspective view of the assembled mounting shown in FIG. 2.

A typical prior art mounting that may exert such thermally or mechanically produced stress is shown in FIGS. 2 and 3. FIG. 2 is an exploded perspective view of this mounting and FIG. 3 is a perspective view of the assembled mounting. This mounting comprises a holder 20 that includes a retaining channel 22 along its length. The bottom surface of the channel 22 is V-shaped to conformably abut two corresponding adjacent sides of a ferroelectric crystal 24, such as a KNbO$_3$ crystal. A key 26 mounts within the channel 24 with side surfaces and a V-shaped bottom surface that conformably abut the corresponding side surfaces of the channel 22 and the other two adjacent sides of the crystal 24.

The crystal 24 is securely fastened within the mounting by clamping it between the key 26 and the holder 20. This is done with a set screw 28 that provides adjustable clamping force on the crystal 24. This mounting arrangement distributes the clamping force evenly along all four surfaces of the crystal 24 to minimize the formation of domains while providing rigid support.

For the purpose of SHG using 864 nm radiation as described above, one set of suitable dimensions for the crystal 24 are approximately 3×3×6 mm. The crystal 24 is cut with the b-axis and the c-axis both substantially parallel to the short dimensions of the crystal 30, with the a-axis substantially parallel to the long dimension. The mounting shown in FIG. 2 is oriented so that the 864 nm radiation from the fundamental wavelength laser source 2 along the optical path 6 is substantially parallel to the a-axis. The b-axis in this case is the axis of highest refractive index, directly corresponding to that of the basic perovskite cell. The c-axis is the polar axis of the crystal, corresponding to the axis of lowest refractive index. Qualitatively, the direction of the c-axis is that of lowest density and the direction of the b-axis is that of highest density.

Unfortunately, this type of mounting exerts a significant amount of stress on the c-axis of the crystal 24, thereby causing the crystal 24 to be prone to stray domain formations. Any amount of force applied to the c-axis of the crystal 24 generally causes it to depole from the initial single domain in service.

Figure 4:
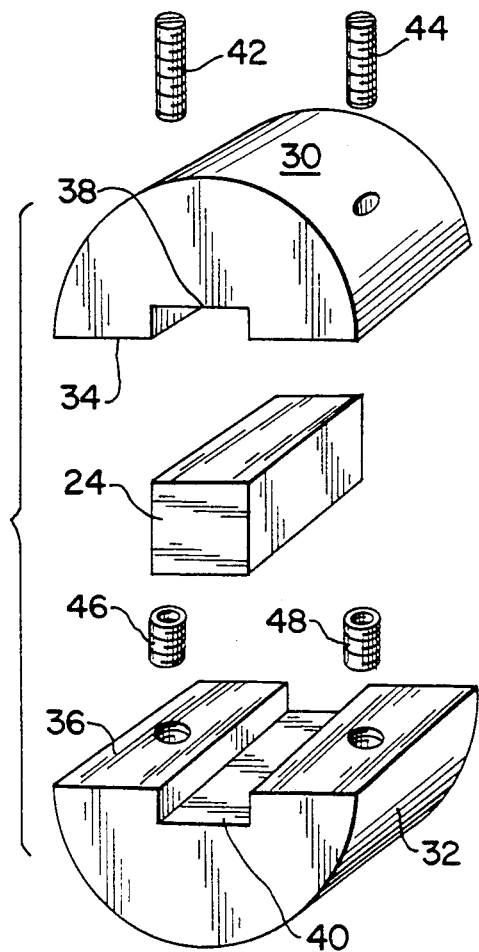
FIG. 4 is an exploded perspective view of a mounting for a nonlinear ferroelectric crystal medium according to the preferred embodiment of the present invention.
Figure 5:
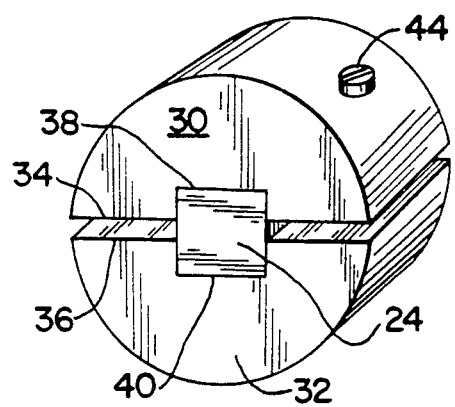
FIG. 5 is an exploded perspective view of the assembled mounting shown in FIG. 4.

A mounting that provides special support to overcome formation of stray domains due to thermal or mechanical stress is shown in FIGS. 4 and 5. FIG. 4 is an exploded perspective view of this mounting and FIG. 5 is a perspective view of the assembled mounting. The mounting comprises a first holder section 30 and a second holder section 32. The first holder section 30 and the second holder section 32 each have respective adjacent surfaces 34 and 36 between which the crystal 24 is retained. Each of the adjacent surfaces 34 and 36 have respective substantially rectangular retaing channels 38 and 40 to retain the crystal 24 therein.

The first holder section 30 and the second holder section 32 are clamped together with respective left and right set screws 42 and 44. The tightening of the left and right set screws 42 and 44 cause pressure to be applied to the crystal 24 in a direction that is substantially parallel to their length. The first holder section 30 and the second holder section 32 are kept in alignment with each other when the left and right set screws 42 and 44 are loosened for crystal mounting by respective left and right compression springs 46 and 48 that surround the shafts of the left and right set screws 42 and 44.

The a crystal 24 is mounted within the retaining channels 38 and 40 with its b-axis substantially parallel to the length of the left and right set screws 42 and 44. With the crystal 24 so mounted, increasing clamping force applied by the first and second holder sections 30 and 32 compresses the crystal 24 to a substantial degree only along the b-axis. With this configuration, little or no force is applied to the c-axis. The pressure applied along the b-axis therefore not only applies sufficient force to the crystal 24 to provide a rigid mounting, but it also reduces the formation of stray domains because the high pressure differential between the b-axis and the c-axis acts to retain the singular domain of the crystal 24 as fabricated.

Application of pressure along the direction of the c-axis therefore causes the crystal 24 to adjust its shape to reduce its internal pressure. This happens through the formation of domains, other than its initial single domain, in which the polar axis c rotates to another direction, thereby depoling the crystal 24 from its initial single domain. The present invention minimizes the occurance of this phenomenon due to thermal stress or mechanical shock by providing significantly more pressure on the crystal 24 along the b-axis than the c-axis. This pressure differential thereby preserves the initial single domain of the crystal 24.

In the example of the preferred embodiment described above, the mounting for the crystal 24 is oriented so that the optical path 6 preferably propagates the 864 nm radiation substantially along the a-axis of the crystal 24. In fact, this is generally true for SHG of frequencies that correspond to wavelengths in the 850 to 864 nm range. When the fundamental wavelength laser source has a lower fundamental frequency that corresponds to a longer wavelength, such as in the range of 946 nm, it is necessary to propagate at some angle to the axis in the plane formed by the a-axis and the b-axis in the crystal 24.

Figure 6:
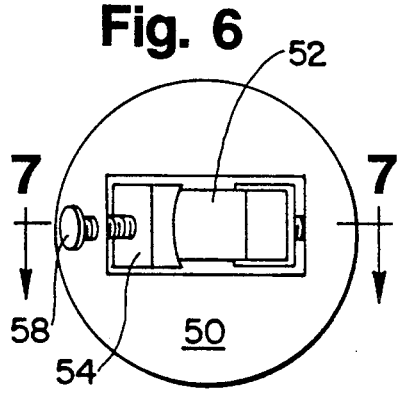
FIG. 6 is a front view of a mounting for a nonlinear ferroelectric crystal medium according to an alternate embodiment of the present invention.
Figure 7:
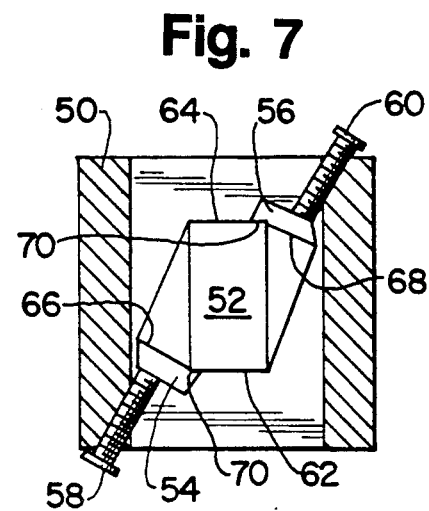
FIG. 7 is a top sectional view of the mounting shown in FIG. 6.

An alternative embodiment of the invention is suitable for the implementation of the present invention with such longer wavelengths is shown in FIGS. 6 and 7. FIG. 6 is a front view of this mounting and FIG. 7 is a sectional top view of the assembled mounting along the line 7—7 shown in FIG. 6. In this alternative embodiment, the ferroelectric crystal that is used in the nonlinear medium 8 is preferably cut and mounted so that the angle of the a axis is at some angle with respect to the propagation of radiation from the fundamental wavelength laser source 2 along the optical path 6 within the plane formed by the a-axis and the b-axis. This angle, referred to as the angle $\theta$, depends upon the wavelength of the radiation, but it is in the vicinity of 30° degrees when the radiation is in the 946 nm range.

The alternative embodiment comprises a mounting with a holder 50 that serves to hold a KNbO$_3$ crystal 52 between a first retainer 54 and a second retainer 56, with the first retainer 54 and the second retainer 56 adjustably connected to the holder 50 by a first set screw 58 and a second set screw 60, respectively. The crystal 52 is cut from stock so that it has an entrance face 62 and an exit face 64 that are substantially parallel to the a axis of the crystal 52. The crystal 52 is oriented in the mounting to let the radiation of the fundamental wavelength laser source 2 pass along the optical path 2 pass substantially perpendicular to the entrance face 62 and the exit face 64. The crystal 52 has a first adjacent side 66 that abuts the first retainer 54 and a second adjacent side 68 that abuts the second retainer 56. The surfaces of the first adjacent side 66 and the second adjacent side 68 are consequently at the angle $\theta$ from the direction of the radiation through the crystal 52.

The first retainer 54 and the second retainer 56 must be positioned in the mounting so that they apply evenly distributed force along the b axis of the crystal 52 while permitting the radiation to pass through a relatively large aperture of the crystal 52. They must be adjustably mounted within the holder 50 to securely clamp the crystal 52 between its first adjacent side 66 and its second adjacent side 68. The first retainer 54 and the right retainer 56 are specially configured to permit the required orientation of the crystal 52 within the holder 50. The first set screw 58 and the second set screw 60 screw into the holder 50 along axes that are substantially parallel to the b axis of the mounted crystal 52.

The required dimensions for the crystal 52 are dependent upon the length of the entrance face 62 and exit face 64, the depth d of the crystal 52 along the axis of radiation propagation and the angle $\theta$. The overall width w of the crystal 52 may be expressed as $$w = d \sin(\theta) + l \cos(\theta).$$

The overall depth v of the crystal 52 may be expressed as $$v = d \cos(\theta) + l \sin(\theta).$$

If d is 5 mm, l is 3 mm and $\theta$ is 30° degrees,
$w = 5 \sin(30) + 3 \cos(30) = 3.366$ mm, and $v = 5 \cos(30) + 3 \sin(30) = 5.83$ mm.

The crystal 52 is easily fabricated from a $KNbO_3$ crystal having an overall size of approximately $3 \times 3.37 \times 4.85$ mm. The corners of the crystal 52 are removed along the planes of the entrance face 62 and the exit face 64. The first holder section 54 and the second holder section 56 overlap the entrance face 62 and the exit face 64 according to the relationship $$\text{overlap} = w - 2 |\cos(\theta)| = d \sin(\theta) - |\cos(\theta)|.$$

Since $\theta$ is 30° degrees, overlap = 5 sin (30) − 3 cos (30) = 2.5 − 2.598 = −0.098 mm.

This overlap may be accommodated by providing lips 70 on the first holder 54 and the second holder 56 to distribute pressure on the overlap regions of the entrance face 62 and the exit face 64 along the b axis of the crystal 52. The dimensions for other wavelengths that require a different value of $\theta$ may be calculated according to the relationships described above.

Although the embodiments set forth above are described using a nonlinear medium that comprises a $KNbO_3$ crystal, the present invention is applicable to any material in which the polar axis can lie along more than one direction. Furthermore, it has been discovered that alternatively the crystal can be compressively retained along the a axis instead of the b axis with some improvement over the prior art with respect to stray domain formations.

Although the embodiments set forth above illustrate the case wherein the invention is applied to a system in which the nonlinear medium 8 is mounted in an external optical cavity that is separate from the fundamental wavelength laser source 2, the invention also works well with intracavity NLO systems, wherein the nonlinear medium 8 is mounted within the optical cavity of the fundamental wavelength laser source 2. The same mounting arrangements as shown in FIGS. 4 through 7 may be used for such intracavity NLO systems.

Thus, there has been described herein a method and apparatus for minimizing domains in ferroelectric crystals from depoling away from a single initial domain by providing compressive stress along a preferred crystallographic axis. It will be understood that various changes in the details, materials, steps and arrangements of parts that have been described and illustrated above in order to explain the nature of the invention, may be made by those of ordinary skill in the art within the principle and scope of the present invention as expressed in the appended claims.

What is claimed is:

1. For a laser system having a fundamental wavelength laser source and a nonlinear crystalline medium for accepting radiation from the fundamental wavelength laser source, the nonlinear medium having at least a first crystallographic axis of highest density, a second crystallographic axis of lowest density and a substantially singular initial domain, a method of minimizing the formation of domains in the nonlinear medium that substantially deviate from the initial domain, comprising the steps of:

positioning said nonlinear medium to accept radiation from said fundamental wavelength laser source; and compressing said positioned medium along said first axis to create a pressure differential between said first and second axes that is sufficient to minimize the formation of domains that deviate from said initial domain.

2. The method as set forth in claim 1, wherein the step of positioning said medium comprises the step of orienting said positioned medium to pass said radiation through said positioned medium along a third crystallographic axis.

3. The method sa set forth in claim 1, wherein the step of positioning said medium comprises the step of orienting said positioned medium to pass said radiation through said positioned medium at a predetermined angle from a plane formed by said first crystallographic axis and a third crystallographic axis.

4. The method as set forth in claim 1, wherein the step of positioning comprises the step of positioning said nonlinear medium within a resonant optical cavity that is separate from said fundamental wavelength laser source.

5. The method as set forth in claim 1, wherein the step of positioning comprises the step of positioning said nonlinear medium within a resonant optical cavity of said fundamental wavelength laser source.

6. The method as set forth in claim 1, wherein the means for positioning comprises means for positioning said nonlinear medium within a resonant optical cavity of said fundamental wavelength laser source.

7. In a laser system having a fundamental wavelength laser source and a nonlinear crystalline medium for accepting radiation from the fundamental wavelength laser source, the nonlinear medium having at least a first crystallographic axis of highest density, a second crystallographic axis of lowest density and a substantially singular initial domain, an apparatus for preventing the formation of domains in the nonlinear medium that substantially deviate from the initial domain, comprising:

means for positioning said nonlinear medium to accept radiation from said fundamental wavelength laser source; and means for compressing said positioned medium along said first axis to create a pressure differential between said first and second axes that is sufficient to prevent formation of domains that deviate from said initial domain.

8. The apparatus as set forth in claim 7, wherein the means for positioning said medium comprises means for orienting said positioned medium to pass said radiation through said positioned medium along a third crystallographic axis.

9. The apparatus as set forth in claim 7, wherein the means for positioning said medium comprises means for orienting said positioned medium to pass said radiation through said positioned medium at a predetermined angle from a plane formed by said first crystalographic axis and a third crystallographic axis.

10. The apparatus as set forth in claim 7, wherein the means for positioning comprises means for positioning said nonlinear medium within a resonant optical cavity that is separate from said fundamental wavelength laser source.

11. For a laser system having a fundamental wavelength laser source and a nonlinear crystalline medium for accepting radiation from the fundamental wavelength laser source, the nonlinear medium having at least a first crystallographic axis of highest density, a second crystallographic axis of lowest density and a substantially singular initial domain, a method of minimizing the formation of domains in the nonlinear medium that substantially deviate from the initial domain, comprising the steps of:

positioning said nonlinear medium to orient radiation from said fundamental wavelength laser source through said positioned medium along a third crystallographic axis of said nonlinear medium; and compressing said positioned medium along said first axis to create a pressure differential between said first and second axes that is sufficient to minimize the formation of domains that deviate from said initial domain.

12. The method as set forth in claim 11, wherein the step of positioning comprises the step of positioning said nonlinear medium within a resonant optical cavity that is separate from said fundamental wavelength laser source.

13. The method as set forth in claim 11, wherein the step of positioning comprises the step of positioning said nonlinear medium within a resonant optical cavity of said fundamental wavelength laser source.

14. For a laser system having a fundamental wavelength laser source and a nonlinear crystalline medium for accepting radiation from the fundamental wavelength laser source, the nonlinear medium having at least a first crystallographic axis of highest density, a second crystallographic axis of lowest density and a substantially singular initial domain, a method of minimizing the formation of domains in the nonlinear medium that substantially deviate from the initial domain, comprising the steps of:

positioning said nonlinear medium to orient said positioned medium to pass radiation from said fundamental wavelength laser source through said positioned medium at a predetermined angle from a plane formed by said first crystalographic axis and a third crystallographic axis; and compressing said positioned medium along said first axis to create a pressure differential between said first and second axes that is sufficient to minimize the formation of domains that deviate from said initial domain.

15. The method as set forth in claim 14, wherein the step of positioning comprises the step of positioning said nonlinear medium within a resonant optical cavity that is separate from said fundamental wavelength laser source.

16. The method as set forth in claim 14, wherein the step of positioning comprises the step of positioning said nonlinear medium within a resonant optical cavity of said fundamental wavelength laser source.

17. In a laser system having a fundamental wavelength laser source and a nonlinear crystalline medium for accepting radiation from the fundamental wavelength laser source, the nonlinear medium having at least a first crystallographic axis of highest density, a second crystallographic axis of lowest density and a substantially singular initial domain, an apparatus for minimizing the formation of domains in the nonlinear medium that substantially deviate from the initial domain, comprising:

means for positioning said nonlinear medium to orient radiation from said fundamental wavelength laser source through said positioned medium along a third crystallographic axis of said nonlinear medium; and means for compressing said positioned medium along said first axis to create a pressure differential between said first and second axes that is sufficient to minimize the formation of domains that deviate from said initial domain.

18. The apparatus as set forth in claim 17, wherein the means for positioning comprises means for positioning said nonlinear medium within a resonant optical cavity that is separate from said fundamental wavelength laser source.

19. The method as set forth in claim 17, wherein the means for positioning comprises means for positioning said nonlinear medium within a resonant optical cavity of said fundamental wavelength laser source.

20. In a laser system having a fundamental wavelength laser source and a nonlinear crystalline medium for accepting radiation from the fundamental wavelength laser source, the nonlinear medium having at least a first crystallographic axis of highest density, a second crystallographic axis of lowest density and a substantially singular initial domain, an apparatus for minimizing the formation of domains in the nonlinear medium that substantially deviate from the initial domain, comprising:

means for positioning said nonlinear medium to orient radiation from said fundamental wavelength laser source through said positioned medium at a predetermined angle from a plane formed by said first crystallographic axis and a third crystallographic axis; and means for compressing said positioned medium along said first axis to create a pressure differential between said first and second axes that is sufficient to minimize the formation of domains that deviate from said initial domain.

21. The apparatus as set forth in claim 20, wherein the means for positioning comprises means for positioning said nonlinear medium within a resonant optical cavity that is separate from said fundamental wavelength laser source.

22. The method as set forth in claim 20, wherein the means for positioning comprises means for positioning said nonlinear medium within a resonant optical cavity of said fundamental wavelength laser source.

* * * * *